UNITED STATES PATENT OFFICE.

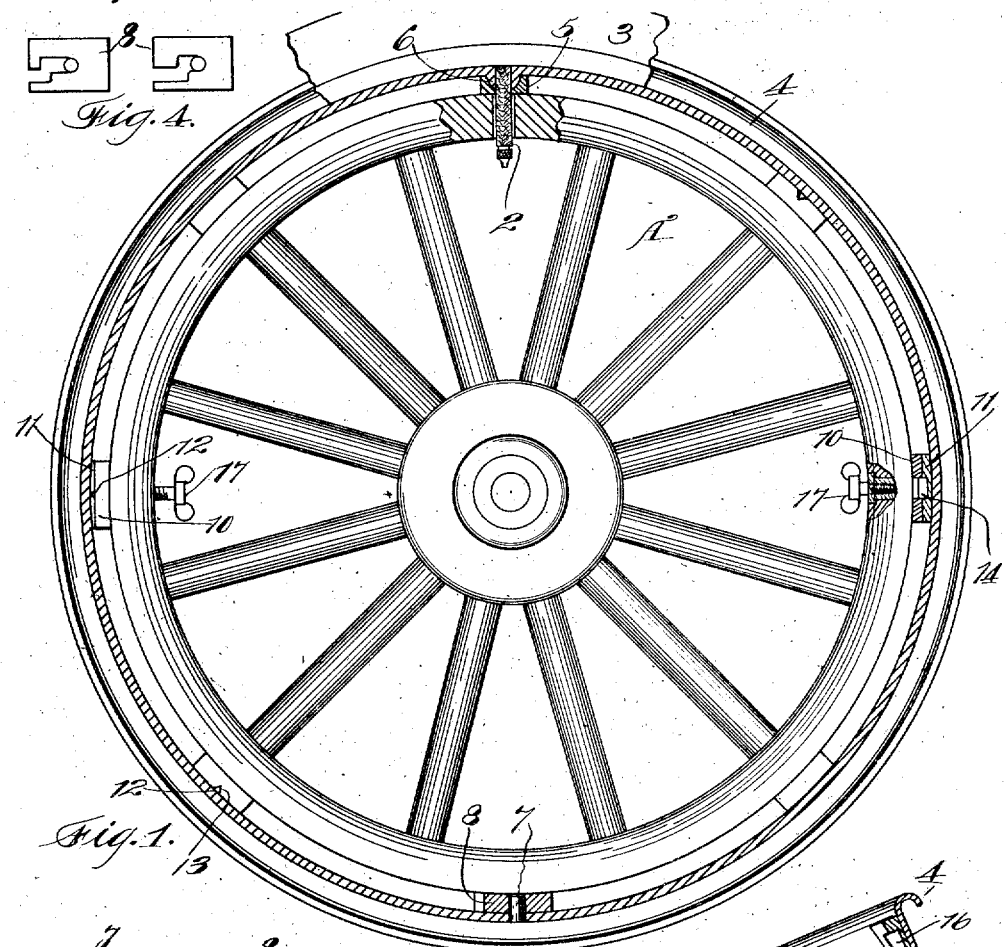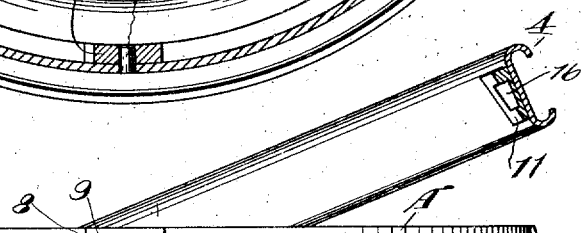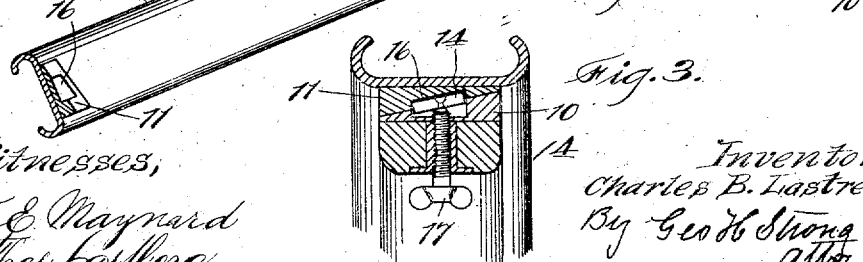

CHARLES B. LASTRETO, OF OAKLAND, CALIFORNIA.

DEMOUNTABLE VEHICLE-RIM.

988,722.  Specification of Letters Patent.  Patented Apr. 4, 1911.

Application filed November 22, 1909. Serial No. 529,261.

*To all whom it may concern:*

Be it known that I, CHARLES B. LASTRETO, a citizen of the United States, residing at Oakland, in the county of Alameda and State of California, have invented new and useful Improvements in Demountable Vehicle-Rims, of which the following is a specification.

My invention relates to vehicle wheels, and pertains especially to a demountable rim for automobiles and the like.

In order to overcome delays in replacing punctured inner tubes or damaged tires in automobiles, it is common either to use so-called "separable" rims, or rims having a section which can be taken off by loosening a series of bolts and clamps, so as to enable the tire to be removed and a new one put on or replaced; or in place of the detachable tire, it is common to employ a completely set-up extra wheel having the tire in place and pumped up, which extra wheel is carried on the machine, and in case anything goes wrong with one of the running wheels, the injured member is removed and the new one put on. This latter method is an expensive one, as it requires a complete extra wheel to be carried, while the former method of employing a so-called "separable" rim is slow and tedious, and it is often very hard indeed to get a tire off when out on the road, and especially at night.

The object of my invention is to provide a demountable rim, or a rim which can be taken off in its entirety quickly and readily from the wheel, and another rim having a complete tire in place already pumped up to put on to the wheel. In other words, instead of carrying a complete extra wheel with tire, all I need to carry is an extra rim with its tire.

The invention consists of the parts and the construction and combination of parts as hereinafter more fully described and claimed, having reference to the accompanying drawings, in which—

Figure 1 is a side elevation, in partial section, of the wheel. Fig. 2 is a sectional plan view. Fig. 3 is a transverse section through the locking device. Figs. 4 and 5 show various forms of locking block.

A represents an ordinary automobile wheel having a hole bored through the felly for the purpose of inserting therethrough the regular air valve-stem 2 of the pneumatic tire 3.

4 represents a removable rim which may be of any suitable construction, such as the ordinary clencher type, or any separable types. The inside diameter of this rim is larger by about one-fourth to two inches, more or less, than the outside diameter of the felly of the wheel. On the felly of the wheel at the place where the valve-stem 2 is inserted, is a metal block 5 of thickness about one-half the difference of these diameters for the tire rim to rest upon. I may or may not have a spherical depression in the block in which fits a small spherical projection 6 from the inside of the tire rim, through the center of which a proper aperture permits the projection of the tire valve-stem 2.

Diametrically opposite the stem 2 and carried by the tire rim is a projection, such as the pin 7, about one-half of an inch in diameter and of a length equal to or less than the difference in the diameters of the rim and felly; and on the felly is a metal block 8 large enough for the required strength, say the width equal to that of the felly and about two to four inches in length of arc and of a thickness about equal to one-half the difference in the aforementioned diameters of rim and felly. This block 8 has a groove 9 of suitable width for the travel therethrough of the pin 7 projecting from the inside of the rim, and said groove being diagonal, bayonet-fashion or otherwise, as represented in Figs. 4 and 5, the groove being open to one side of the block and its inner end being in diametral line with the hole for valve stem 2.

With the rim engaged with the felly at the two diametral points represented by the knob 6 and pin 7, it will be seen if the rim is held in such a position that its plane will form an angle with the plane of the wheel felly (the pin 7 being pushed through the groove 9 to its seat which is situated diametrically opposite the valve-stem) the rim may be turned on the knob 6 and pin 7 as an axis into the plane of the wheel and locked there by suitable means shortly to be described. One object of the valve-stem spherical knob 6 is to hold the rim against radial and circumferential movement with regard to the felly and to protect the valve-stem. The principal object of the pin 7 and groove 9 is to guard against axial motion, and also in some shapes of groove, as Figs. 4 and 5, against circumferential motion;

and to permit of a quick connection and disconnection of the rim and felly.

On the periphery of the felly and on each side of the half of the wheel, cut by the axis through the hub, valve-stem and pin, there is a plurality of segmental wedge-shaped blocks 10 extending crosswise or in the axial direction of the wheel. The greatest thickness of these wedges is about the difference of one-half in the diameters. Those on the one half side of the felly are made to wedge in one direction, and those on the other half in the other direction. Similar, but opposite wedge-shaped blocks 11, and of about the same sizes, are fixed integrally on the rim in such a way that by rotating the plane of the rim on the axis through the valve-stem, hub and pin, to a point where the planes of the rim and felly coincide or are parallel, these wedge-shaped blocks will give rigid support to the rim on the felly. The segmental wedges on the felly may have ridges 12 angular in cross-section to fit corresponding depressions 13 on the rim, or vice versa, and running in a direction substantially parallel with the wheel axle for the purpose of additionally guarding against rotary movements of the rim on the felly. The rim is thus rigidly held and strongly supported on the felly against all possible movements and strains, excepting that of rotation on the pivots 6—7 mentioned. Any suitable means may be employed to hold the rim against such motion, and lock it rigidly to the wheel.

I have shown one convenient method of locking the rim in the plane of the wheel, in which one or more latch members or blocks 14 may be employed; these latches preferably being countersunk into suitable mortises in the felly wedge members 10 and adapted to catch in the corresponding undercut portion 16 in the outer series of wedge members 11 on the rim. By placing the latches 14 in the wedges they are protected from the elements. Any suitable means may be employed to retract the latches so as to allow the rim to be demounted. As here shown, a screw member 17 suitably threaded in the felly is engageable with each latch member 14, so that by turning the screw 17 in one direction the latches are withdrawn out of their mortises 16, leaving the rim free to turn on its pivots 6—7. Turning the screw 17 in the opposite direction thrusts the latches outward to engage and lock the rim after the rim turns into operative position in the plane of the wheel.

It is manifest or possible that the construction herein specified may be varied without departing from the principle of the invention, and I desire it to be understood that the invention is not limited to any specific form or arrangement of parts, except in so far as such limitations or their mechanical equivalents are specified in the claims.

Having thus described my invention, what I claim and desire to secure by Letters Patent is—

1. The combination in a wheel, of an inner rim and an outer endless removable rim, the latter having two diametrically opposed inwardly projecting pivot members removably fitting in sockets in the inner rim, and on which pivots the outer rim is turnable into and out of the plane of the inner rim.

2. The combination in a wheel, of an inner rim and an outer endless removable rim, the latter having two diametrically opposed inwardly projecting pivot members removably fitting in sockets in the inner rim, and on which pivots the outer rim is turnable into and out of the plane of the inner rim, transversely positioned wedges on the inner rim, those on one half of the said rim between the pivots pointing one way and those on the other half pointing the opposite way, and corresponding coacting wedges on the outer rim.

3. The combination in a wheel, of an inner rim and an outer removable rim, an inflatable tire carried by the outer rim, and having an inwardly projecting nipple passing through said outer rim and fitting a radial perforation in the inner rim, said outer rim having a globular inwardly projecting pivotal boss surrounding the nipple and fitting a corresponding globular socket in the inner rim, and the outer rim having an inwardly extending radial projection in the diameter of the nipple and removably fitting a bayonet slot in the inner rim, said two rims turnable on the pivots provided by said projection and boss into and out of coincident planes.

4. The combination in a wheel, of an inner rim and an outer removable rim, an inflatable tire carried by the outer rim, and having an inwardly projecting nipple passing through said outer rim and fitting a radial perforation in the inner rim, said outer rim having a globular inwardly projecting pivotal boss surrounding the nipple and fitting a corresponding globular socket in the inner rim, and the outer rim having an inwardly extending radial projection in the diameter of the nipple and removably fitting a bayonet slot in the inner rim, said two rims turnable on the pivots provided by said projection and boss into and out of coincident planes, oppositely positioned wedges on the two rims which coact to give a rigid support to the outer rim when the latter is turned into the plane of the wheel, and means for locking the rims when the wedges are engaged.

5. The combination in a wheel, of an inner rim and an outer endless removable rim, the latter having two diametrically opposed inwardly projecting pivot members removably fitting in sockets in the inner rim, and on which pivots the outer rim is turnable into and out of the plane of the inner rim, transversely positioned wedges on the inner rim, those on one half of the said rim between the pivots pointing one way, and those on the other half pointing the opposite way, and corresponding coacting wedges on the rim, the wedges on one rim having ridges running in a direction substantially parallel with the wheel axle, and the wedges on the other rim having corresponding depressions.

6. The combination with a wheel and its felly, of a rim having diametrically opposed pivotal supports on the felly, about which pivotal supports the rim is turnable into and out of the plane of the wheel, oppositely positioned wedges on the rim and felly which coact to give a rigid support to the rim when the latter is turned into the plane of the wheel, and means for locking the rim when said wedges are engaged.

7. The combination with a wheel and its felly, of a rim having diametrically opposed pivotal supports on the felly, about which pivotal supports the rim is turnable into and out of the plane of the wheel, said rim having on one-half of its interior, wedges projecting to one side of the rim, and having oppositely projecting wedges on its other half, and correspondingly positioned wedges on the felly.

In testimony whereof I have hereunto set my hand in the presence of two subscribing witnesses.

CHARLES B. LASTRETO.

Witnesses:
RAYMOND A. LEONARD,
CHARLES A. PENFIELD.